United States Patent [19]

Barger et al.

[11] Patent Number: 5,100,709

[45] Date of Patent: Mar. 31, 1992

[54] MULTILAYER FILM COATING FOR RIGID, SMOOTH SURFACES

[75] Inventors: Dennis D. Barger, Midlothian, Va.; Carl D. Ray, Terra Haute, Ind.

[73] Assignee: Tredegar Industries, Inc., Richmond, Va.

[21] Appl. No.: 452,680

[22] Filed: Dec. 18, 1989

Related U.S. Application Data

[63] Continuation-in-part of Ser. No. 107,132, Oct. 9, 1987, Pat. No. 4,895,760.

[51] Int. Cl.⁵ .............. A61F 13/02; B32B 27/08; B32B 27/36
[52] U.S. Cl. .................. 428/41; 428/332; 428/412; 428/476.1; 428/483; 428/516; 428/518
[58] Field of Search ............ 428/41, 332, 412, 476.1, 428/576, 518, 483

[56] References Cited

U.S. PATENT DOCUMENTS

| | | |
|---|---|---|
| 3,965 | 3/1865 | Shecut et al. |
| Re. 32,929 | 5/1989 | Ewing |
| 2,279,901 | 4/1942 | Domizi |
| 2,543,229 | 2/1951 | Chapman |
| 3,046,155 | 7/1962 | Reinke |
| 3,098,272 | 7/1963 | Frye |
| 3,194,863 | 3/1970 | Williams, Jr. et al. |
| 3,241,795 | 3/1966 | Fry |
| 3,249,044 | 5/1966 | Karlyn |
| 3,348,995 | 10/1967 | Baker et al. |
| 3,380,871 | 4/1968 | Thomas |
| 3,389,036 | 6/1968 | Rudolph et al. |
| 3,420,679 | 1/1969 | Gifford et al. |
| 3,501,365 | 3/1970 | Marshall |
| 3,503,834 | 3/1970 | Schroter |
| 3,503,843 | 3/1970 | Williams, Jr. et al. |
| 3,504,075 | 3/1970 | Williams, Jr. et al. |
| 3,540,959 | 11/1970 | Connor |
| 3,690,909 | 9/1972 | Finley |
| 3,702,258 | 11/1972 | Gibbons et al. |
| 3,746,566 | 7/1973 | Haratsuka et al. .......... 428/412 |
| 3,776,805 | 12/1973 | Hansen .......... 428/412 |
| 3,853,595 | 12/1974 | Pedginski et al. |
| 3,880,311 | 4/1975 | McPhee |
| 4,060,168 | 11/1977 | Romagnoli |
| 4,121,003 | 10/1978 | Williams |
| 4,151,319 | 4/1979 | Sackoff et al. |
| 4,217,164 | 8/1980 | LaMers |
| 4,273,816 | 6/1981 | Tollette |
| 4,303,661 | 12/1981 | Bell |
| 4,317,852 | 3/1982 | Ogden |
| 4,330,352 | 5/1982 | Grimes et al. |
| 4,343,856 | 8/1982 | Goswami et al. |
| 4,376,147 | 3/1983 | Byrne et al. |
| 4,394,416 | 7/1983 | Shimizu et al. |
| 4,454,180 | 6/1984 | LaMers |
| 4,477,502 | 10/1984 | O'Sullivan |
| 4,546,029 | 10/1985 | Cancio et al. |
| 4,560,614 | 12/1985 | Park |
| 4,671,846 | 6/1987 | Shimbo et al. |
| 4,713,273 | 12/1987 | Freedman |
| 4,888,075 | 12/1989 | Freedman |
| 4,895,760 | 1/1990 | Barger |
| 4,946,532 | 8/1990 | Freeman |

FOREIGN PATENT DOCUMENTS

| | | |
|---|---|---|
| 45-31686 | 10/1970 | Japan |
| 49-29613 | 5/1974 | Japan |
| 52-112640 | 3/1976 | Japan |
| 53-058542 | 5/1978 | Japan |
| 58-208364 | 12/1983 | Japan |
| 61-116541A | 6/1986 | Japan |
| 1487749 | 10/1977 | United Kingdom |
| 2132348A | 7/1984 | United Kingdom |

OTHER PUBLICATIONS

Handbook of Adhesives, I. Skeist, ed., Van Nostrand Reinhold Co., N.Y., 1977, p. 725.
Modern Plastics Encyclopedia, p. 550, McGraw Hill, 1980.

*Primary Examiner*—P. C. Sluby
*Attorney, Agent, or Firm*—Emch, Schaffer, Schaub & Porcello

[57] ABSTRACT

Covering a rigid or hard but pliable, smooth surface with a multilayer masking film having a smooth side and an embossed side is disclosed. The smooth side of the masking film is in direct contact with the smooth surface being covered. Adhesion of the smooth side of the masking film to the smooth surface to which it is applied is effected much like a vacuum adhesion as seen when a drop of water is placed between two sheets of glass. The embossed side of the masking film forms microscopic air pockets when rolled upon itself which prevents blocking. This feature allows the non-embossed side to be made as smooth as possible without the need for an anti-blocking agent.

25 Claims, No Drawings

MULTILAYER FILM COATING FOR RIGID, SMOOTH SURFACES

This invention is a continuation-in-part of copending patent application Ser. No. 107,132 filed Oct. 9, 1987, now U.S. Pat. No. 4,895,760, issued Jan. 23, 1990.

TECHNICAL FIELD

This invention relates to the masking of rigid but pliable, smooth surfaces and more particularly to masking with a multilayer masking film having a smooth side comprising at least one layer of a thermoplastic adhesiveless film and an embossed side comprising at least one layer of a matte embossed film.

BACKGROUND

The function of a masking film is to form a protective cover or coating to prevent scratching, scuffing, and distortions of the smooth surface to which it is applied. This protective cover or coating is necessary for shipment and during use of the product having the smooth surface.

Previously, conventional corona treated film and/or adhesive coated masking paper have been used for masking applications upon rigid or hard, but still pliable, smooth surfaces of plastics especially polycarbonates. Polycarbonate sheet which typically is rigid and over 10 mils thick is usually masked with an adhesive backed paper. By contrast, polycarbonate film which typically is flexible and less than or equal to 10 mils thick is usually masked with a polyethylene film.

In masking polycarbonate film, two different types of polyethylene film are used to protect the sides of the polycarbonate film. One side may be covered with a one mil, corona treated, non-embossed, low slip, low density polyethylene film. The other side may be covered with a 3 mil, low density polyethylene film which has been coated with a heat activated adhesive. Frequently, polycarbonate film is sold by the manufacturer to intermediate operations which print upon the polycarbonate film prior to shipment to an end user. The polyethylene film is used as a protective layer both before and after the polycarbonate sheet is printed. The 1 mil layer is normally removed immediately before printing whereas the adhesive coated, 3 mil, low density layer remains on the polycarbonate throughout the printing process and is only removed by the end user. Normally in the manufacturing process, both polyethylene film layers are applied to the polycarbonate film simultaneously shortly after it is extruded. The polyethylene is applied with a nip roll when the polycarbonate sheet is between 100° and 200° F. The temperature varies with the thickness of the sheet.

By contrast, polycarbonate sheeting normally utilizes a paper based masking for protection on both sides of the sheet. The paper uses a heat activated acrylic adhesive to effect its adhesion to the polycarbonate. Frequently, humidity from the air permeates the paper and causes delamination between the paper and the adhesive. This allows the adhesive to remain on the polycarbonate sheet after the paper mask is removed. The adhesive then must be removed from the polycarbonate with a solvent.

Various problems exist with polyethylene films currently used to mask polycarbonate films or sheets. One problem is that often, a different polyethylene film is used for each surface or side of the polycarbonate film, causing increases in film inventory and complication of logistics and production methods. These increases and complications are a result of handling two types of film rather than one. Another problem is that currently used one mil, low slip, low density polyethylene film has been known to completely laminate to the polycarbonate film to which it is applied. This lamination renders the polycarbonate film essentially useless.

Another problem stems from the fact that the polyethylene film is received from the manufacturer and applied to the polycarbonate film from a roll. Polyethylene film blocks on the roll and develops hard wrinkles. These hard wrinkles are a problem since they do not come out of the polyethylene film prior to application on the polycarbonate film. These wrinkles will permanently distort the pliable surface of the polycarbonate film and render it useless for its desired end uses.

Still another problem arises due to application of the adhesive coated, 3 mil, low density polyethylene film itself which adheres to the polycarbonate film through the use of a heat activated adhesive. This adhesive can leave a residue on the polycarbonate film which is also undesirable.

Problems also exist with the adhesive paper mask used to protect the polycarbonate sheeting from scratches and dents during shipping and handling. The paper with adhesive is applied to the polycarbonate sheet at temperatures ranging from 100°-320° F. Frequently, humidity from the air permeates the paper and causes delamination. Similar problems exist for acrylic, glass, polished or painted metals and other items which have a rigid, smooth surface.

These currently used films of the related art will now be explained in more detail.

The one mil, low slip, low density polyethylene film is a corona treated type of masking film. Corona treatment is the utilization of an electrostatic discharge to increase the film's adhesion level. The electrostatic discharge causes surface oxidation of the film whereby the non-polar saturated hydrocarbon surface becomes more chemically reactive to polar surfaces which, in effect, increases the adhesion level of the non-polar surface. Currently used masking film is non-embossed and relies on a very narrow window of corona treatment to facilitate the films adhesion to a smooth surface. The corona treatment process cannot be controlled precisely enough to insure production is maintained within the desired window. When there is too little corona treatment, the masking film will not adhere to a smooth surface. When there is too much corona treatment, the masking film will either stick to itself and block within the roll, or the film will laminate to the smooth surface to which it is applied and become unremovable.

Corona treated masking films have a relatively high surface coefficient of friction (greater than 0.5). These films are extremely difficult to wind without inducing hard wrinkles which will distort a pliable, smooth surface upon application. Corona treated masking films normally have large and numerous gels and carbon specks which tend to dimple or distort the smooth surface of the substrate being protected. Gels are defined as unmelted polyethylene particles which range from a barely visible size up to larger than a pencil point.

Consequently, these masking films rely on a chemical differential slip where the chemical additive blooms or migrates to the outside surface of the masking film. While this prevents blocking or sticking of the masking film as it is unwound from the roll, the slip normally impairs the film's adhesion to a smooth surface rendering it less desirable as a masking film.

The aforedescribed adhesive coated, 3 mil, low density, polyethylene film is an example of an adhesive masking film. These films are non-embossed and affect their adhesion from a surface applied adhesive. The disadvantage of this type of film is that the adhesive residue is frequently left on the smooth surface following removal of the mask. Solvents must be used to remove this residue. At times the adhesive is too aggressive (adheres with great strength) which virtually makes the masking film unremovable. Similar to corona treated maskings, the adhesive masking films also are subject to hard wrinkles and gels.

While one-sided, matte embossed, polyethylene films are in existence, they are used as photopolymer cover sheets. Most photopolymers have the consistency of jelly. The photopolymers are coated upon a base of polyester film which acts as a protective carrier sheet. The one-sided, matte embossed, polyethylene film is then applied with the smooth, non-embossed side coming in contact with the exposed photopolymer surface and acting as a cover sheet. The net result is a three layered sandwich consisting of polyester film/photopolymer/matte polyethylene which is then wound up in rolls of varying widths of up to 60 inches and diameters of 10-12 inches.

Currently, photopolymers are made using two different types of polyethylene cover sheet films. If a photopolymer coating is to be thin, a one-sided matte polyethylene film is used with the smooth side applied to the photopolymers. If the photopolymer layer is to be thicker, a two-sided matte polyethylene film would be used. The difference between one-sided and two-sided matte embossed is that in one-sided matte embossed, one side is smooth and the opposite side is matte embossed while in two-sided matte embossed, both sides of the film are matte embossed. A two-sided embossment is made by a matte engraved roll that compression embosses the molten polyethylene between the embossing roll and a rubber covered well. A one-sided matte is produced by compression of molten polyethylene between a polished chrome roll and a rubber roll.

Photopolymers are used to make circuit boards. Prior to applying photopolymer to a dielectric board, the matte embossed polyethylene is removed from the three layer sandwich previously described. The exposed surface of the photopolymer is then laid upon the dielectric board. The other side of the photopolymer retains the polyester film carrier sheet. A photo tool is then placed on top of the polyester film and the entire multilayer substrate is then exposed to a light source.

The areas of the photopolymer which were exposed to light, harden and form a protective covering in the dielectric board. The dielectric board, with the exposed photopolymer, is then subjected to numerous chemical baths and rinses with the end result producing a printed circuit board.

SUMMARY OF THE INVENTION

This invention concerns the application of a multilayer masking film having a smooth side and an embossed side wherein the smooth side is applied to a smooth surface without the use of a corona treatment or an adhesive. Current problems in the prior art are solved by achieving a constant, controlled adhesion level without the masking film becoming unremovable or the deposition of an adhesive residue. Other problems which are overcome include film blocking on the roll and wrinkles which occur during winding. These problems are overcome since the multilayer film has an embossed side which traps a quantity of air as it is being wound onto the roll. This air entrapment facilitates the wrinkle-free unwinding of the film from the roll.

Accordingly, this invention concerns application of a mask made of a multilayer, one-sided matte embossed masking film to rigid or hard, but still pliable, smooth surfaces such as the surfaces of plastic film and sheets, including surfaces such as a rigid polycarbonate film like Lexan ® film or acrylics such as Plexiglass ® acrylic sheet. In addition, the multilayer, one-sided matte embossed film may also be applied to other plastics, glass, glazed stoneware and polished or painted metals or any other smooth surface. The multilayer masking film has a smooth side comprising at least one layer of thermoplastic adhesiveless film and an embossed side comprising at least one layer of a matte embossed film. In addition, one or more core layers of film can be interposed between the thermoplastic adhesiveless film layer and the embossed film layer.

These and other embodiments of this invention will become apparent from the ensuing description and appended claims.

DESCRIPTION OF PREFERRED EMBODIMENTS

Preferably, the multilayer one-sided matte embossed masking film is applied to a substrate having a rigid but pliable, hard, smooth surface where the surface smoothenss is in the range of 0 to 150 Ra. In this connection, Ra is defined as the arithmetic average height of the micro peaks to the center line of a particular finished surface as measured by a profilometer. This measurement is usually expressed in $10^{-6}$ microinches. Preferred substrates include polycarbonate substrates, especially polycarbonate sheet having a thickness above 10 mils and polycarbonate film having a thickness of 10 mils or less.

In addition, the multilayer masking film is stable when exposed to moisture, ultraviolet light, and is stable over time.

The multilayer masking film of the present invention has a smooth side comprising at least one layer of a thermoplastic adhesiveless film and an embossed side comprising at least one layer of a matte embossed film. The multilayer masking film can also have a core layer comprising a thermoplastic material interposed between the thermoplastic adhesiveless film layer and the matte embossed film layer.

The thermoplastic adhesiveless film layer used pursuant to this invention is smooth on at least one side. This allows the multilayer masking film to be both easily unwound from a roll and then applied to the substrate. The smooth side of the multilayer masking film is applied to the substrate being masked and it forms a vacuum adhesion. Thus, the multilayer masking film tightly adheres to the substrate but can be removed therefrom when desired.

The multilayer masking film adheres to the surface of the substrate due largely to the intimate contact between the smooth surface of the multilayer masking film and the smooth surface of the substrate. Additional control of the adhesion of the multilayer masking film to the surface of the substrate can be achieved by use of a thermoplastic adhesiveless film layer having the desired surface tension, polarity and mobility.

For best results, it is contemplated that the smooth side of the thermoplastic adhesiveless film layer of the multilayer masking film have a smoothness in the range of from about 0.25 to about 10 Ra. In addition, the thermoplastic adhesiveless film layer preferably has less than about 10 gels per 25 square feet.

It is within the contemplated scope of the present invention that the thermoplastic adhesiveless film layer comprise films of polyethylene (both homopolymers and copolymers), films made of polypropylene, polyvinyl chloride, nylon or polyester may also be used. For example, a thermoplastic adhesiveless film made of a low density polyethylene homopolymer is desirable because a film with a low modulus conforms better to the surface to which is applied. A preferred density is less than or equal to 0.945 g/cc (e.g., 0.910 to 0.960) and a preferred modulus (a measure of flexial stiffness) is less than 100,000 psi. This density ratio is in accord with the National Flexible Packaging Association Specification B-11, test method D1505. The modulus is in accord with the same Association's test method D882.

As another example, when the polyethylene film comprises a low density copolymer of ethylene and vinyl acetate, the film becomes softer and sealing temperatures are lowered as the content of vinyl acetate is increased. The film wets out better on a smooth surface because it is softer. Additionally, by minimizing the number of gels and/or carbon specks present upon the film surface, damage due to denting and/or dimpling will be minimzied when the film is applied to pliable surfaces. Accordingly, use of such copolymers is also preferred. Still other example of useful thermoplastic adhesiveless films include films comprising acid modified copolymers, anhydride modified copolymers, and acid/acrylate modified copolymers.

The matte embossed film layer used pursuant to this invention is embossed on at least one side which provides the multilayer masking film with a cushioning effect. This allows the multilayer masking film to be easily unwound from the roll. The embossed film layer forms an air space between successive layers of multilayer masking film as it is turned into a cylindrical roll. These air spaces prevent the successive layers from adhering to one another and forming a solid unusable piece. Films with random matte embossing are particularly desirable for use in this invention.

The multilayer matte embossed film layer incorporates mechanical differential slip as opposed to chemical induced differential slip. Microscopically, in one embodiment, the embossed film has a random matte rather than a pattern matte. This means the matte embossed surface has high points or peaks with a irregular pattern which prevent the film from blocking on the roll because there is less intimate contact between the film layers. Thus, the embossed film layer, once applied to the substrate, imparts an antiblock characteristic to the finished laminate.

While the preferred embodiment uses embossed films made of polyethylene, any of a variety of suitable thermoplastic materials which can be readily embossed such as films of polyethylene, polyproplene, polyvinyl chloride, nylon, polyester and the like.

The matte embossed film layer can contain various fillers or additives to impart such characteristics to the matte embossed film layer as abrasion resistance, writeability and improved die cuttability. The embossed film layer thus also provides the abrasion resistance needed in a masking film. Further, the embossed surface of the embossed film layer provide a relatively rough surface which allows the surface to be legibly written upon. Also, through the addition of certain additives, the embossed layer has the desired opacity and/or color and surface characteristics which renders it capable of being legibly written upon. In certain applications such as masking polycarbonate sheets it is desirable for the masking film to be capable of being written upon with, for example, a No. 2 pencil. The masking film also serves as a medium for those handling the polycarbonate sheets to write instructions or show designs or lines to be followed with a cutting appartus. For example, if the polycarbonate sheet is to be used for a window glazing application, the contractor can draw the desired height and width outline on the embossed side of the multilayer masking film.

Additives which can be incorporated into the embossed film layer are wellknown and include, for example, calcium carbonate, mica and titanium dioxide. It is within the contemplated scope of the present invention that the embossed film layer can include any additive which whitens and brightens and thereby renders the film capable of being written upon.

The ratio of thermoplastic adhesiveless layer to embossed layer in the multilayer masking film of the present invention varies depending upon the desired characteristics of the multilayer masking film. It is within the contemplated scope of the present invention that the ratios can be varied to accommodate needs for abrasion resistance, stiffness, tensile strength, peel strength and the like. The two layer masking film of the present invention is epecially useful in such end use applications where the adhesiveless masking film is desired to be relatively flexible.

It is also within the contemplated scope of the present invention that at least one core film layer can be interposed between the thermoplastic adhesiveless film layer and the embossed film layer in order to aid in providing the desired opacity and/or color, stiffness and toughness to the multilayer masking film.

The core layer used pursuant to this invention can be any of a wide variety of thermoplastic polymeric or elastomeric materials such as films made of polyethylene, polypropylene, polyvinyl chloride, nylon, polyester, and the like.

The multilayer masking film can be manufactured via well-known coextrusion processes. The use of coextrusion methods of film production prior to the embossing stage provides significant advantages. For instance, it is possible to achieve significant raw material cost savings by utilizing the coextrusion process to make the multilayer masking film when the costs of the thermoplastic film layer are greater than the costs of the embossed film layer.

Further, by using the coextrusion process prior to embossing, it is possible to manufacture a multilayer masking film which consists of separate layers of film each performing a specific function. The thermoplastic adhesiveless film layer achieves adhesion to the substrate without the need for conventional adhesives and without the problems normally associated with the use of such conventional adhesives. The adhesion of the thermoplastic adhesiveless film is achieved and controlled via the natural blocking adhesion found in applying a very smooth surface to another smooth surface, and polar bonding of a polar polymer to a polar substrate (generally by ionic bonding and in some cases, hydrogen bonding).

Any of a variety of conventional methods can be utilized for applying the multilayer masking film to the substrate and for pressing the applied masking film against the smooth surface of the substrate. Generally speaking, the multilayer film will be taken off from a roll and will be directly applied to the substrate by means of a nip roll or similar system through which the multilayer film and the substrate are passed. In this way, the smooth side of the multilayer film is applied to and pressed against the smooth side of the substrate all in one operation. If desired, the resulting article may be passed through additional compression rolls or the like. Other suitable techniques for forming the articles of this invention will now be readily apparent to those skilled in the art.

It can thus be seen that this invention enables the application of a multilayer masking film to a substrate having a smooth surface without relying on an adhesive or corona discharge or other surface treatment for achieving the requisite adhesion. In short, the adhesion depends largely upon the intimate contact between the smooth side of the film and the smooth surface of the substrate and in accomplishing this objective, the masking film used in this operation can be taken directly from a roll of the film. In this unwinding operation, the matte embossed finished on the one side of the masking film prevents the film from blocking and thus it is removed free of such problems as tearing, distortion or wrinkling. Thus anti-blocking additives are unnecessary in the masking films—indeed their presents in amounts more than 400 parts per million would be detrimental as they would tend to prevent the desired adhesion between the masking film and the substrate. In this connection, if small amounts (up to about 400 parts per million) of anti-blocking agents are used, it is desirable to use an diatomaceous earth anti-blocking additive such as $SiO_2$.

Many other variations, modifications, and alternate embodiments may be made in the article and techniques hereinbefore described, by those having experience in this technology, without departing from the concept of the present invention. Accordingly, it should be clearly understood that the article and methods referred to in the foregoing description are illustrative only and are not intended as limitations on the scope of this invention, as defined in the following claims.

We claim:

1. An article comprised of a substrate having a rigid or hard, smooth surface and having affixed thereto a multilayer masking film having a smooth side comprising at least one layer of a thermoplastic adhesiveless film and an embossed side comprising at least one layer of a matte embossed film, the smooth side of the multilayer masking film ranging in smoothness from about 0.25 to about 10 Ra, the smooth side of the multilayer masking film being affixed to the smooth surface of the substrate whereby the multilayer masking film removably adheres to the surface of the substrate.

2. The article of claim 1, whereby the multilayer masking film removably adheres to the surface of the substrate due to the intimate contact between the smooth surface of the multilayer masking film and the smooth surface of the substrate and due to the surface tension, polarity and mobility of the thermoplastic adhesiveless film.

3. The article of claim 1, wherein the substrate is composed of polycarbonate.

4. The article of claim 1, wherein the substrate is composed of a polycarbonate sheet having a thickness above 10 mils and having a surface smoothness in the range of from 0 to 150 Ra.

5. The article of claim 1, wherein the substrate is composed of a polycarbonate film having a thickness of 10 mils or less and having a surface smoothness in the range of from 0 to 150 Ra.

6. The article of claim 1, wherein the thermoplastic adhesiveless film layer is composed of polyethylene.

7. The article of claim 1, wherein the thermoplastic adhesiveless film layer is composed of a low density polyethylene copolymer.

8. The article of claim 1, wherein the thermoplastic adhesiveless film layer is composed of an acid modified copolymer, an anhydride modified copolymer or an acid/acrylate modified copolymer.

9. The article of claim 1, wherein the matte embossed film is a thermoplastic film.

10. The article of claim 1, wherein the matte embossed film layer is composed of polyethylene, polypropylene, polyvinyl chloride, nylon or polyester.

11. The article of claim 1, wherein the matte embossed film layer contains additives to impart abrasion resistance, writeability or die cuttability.

12. The article of claim 1, wherein the multilayer masking film comprises one or more core layers of film interposed between the thermoplastic adhesiveless film layer and the embossed film layer.

13. The article of claim 12, wherein the core film layer is a thermoplastic film.

14. The article of claim 1, wherein the substrate is composed of a polycarbonate sheet having a thickness about 10 mils and having a surface smoothness in the range of about 0 to 150 Ra; and wherein the multilayer film affixed thereto comprises a thermoplastic polyethylene adhesiveless film layer and an embossed thermoplastic film layer.

15. The article of claim 1, wherein the substrate is composed of a polycarbonate film having a thickness of 10 mils or less and having a surface smoothness in the range of from 0 to 150 Ra; and wherein the multilayer film affixed thereto comprises a thermoplastic polyethylene adhesiveless film layer and an embossed thermoplastic film layer.

16. The article of claim 1, wherein the substrate is composed of a polycarbonate sheet having a thickness above 10 mils and having a surface smoothness in the range of from 0 to 150 Ra; and wherein the multilayer film affixed thereto comprises a thermoplastic low density polyethylene copolymer adhesiveless film layer and an embossed thermoplastic film layer.

17. The article of claim 1, wherein the substrate is composed of a polycarbonate film having a thickness of 10 mils or less and having a surface smoothness in the range of from 0 to 150 Ra; and wherein the multilayer film affixed thereto comprises a thermoplastic low density polyethylene copolymer adhesiveless film layer and an embossed thermoplastic film layer.

18. The article of claim 1, wherein the substrate is composed of a polycarbonate sheet having a thickness above 10 mils and having a surface smoothness in the range of from 0 to 150 Ra; and wherein the multilayer film affixed thereto comprises a thermoplastic acid modified copolymer adhesiveless film layer and an embossed thermoplastic film layer.

19. The article of claim 1, wherein the substrate is composed of a polycarbonate film having a thickness of 10 mils or less and having a surface smoothness in the range of from 0 to 150 Ra; and wherein the multilayer film affixed thereto comprises a thermoplastic acid modified copolymer adhesiveless film layer and an embossed thermoplastic film layer.

20. The article of claim 1, wherein the substrate is composed of a polycarbonate sheet having a thickness above 10 mils and having a surface smoothness in the range of from 0 to 150 Ra; and wherein the multilayer film affixed thereto comprises a thermoplastic anhydride modified copolymer adhesiveless film layer and an embossed thermoplastic film layer.

21. The article of claim 1, wherein the substrate is composed of a polycarbonate film having a thickness of 10 mils or less and having a surface smoothness in the range of from 0 to 150 Ra; and wherein the multilayer film affixed thereto comprises a thermoplastic anhydride modified copolymer adhesiveless film layer and an embossed thermoplastic film layer.

22. The article of claim 1, wherein the substrate is composed of a polycarbonate sheet having a thickness above 10 mils and having a surface smoothness in the range of from 0 to 150 Ra; and wherein the multilayer film affixed thereto comprises a thermoplastic acid/acrylate modified copolymer adhesiveless film layer and an embossed thermoplastic film layer.

23. The article of claim 1, wherein the substrate is composed of a polycarbonate film having a thickness of 10 mils or less and having a surface smoothness in the range of from 0 to 150 Ra; and wherein the multilayer film affixed thereto comprises a thermoplastic acid/acrylate modified copolymer adhesiveless film layer and an embossed thermoplastic film layer.

24. The article of claim 1, wherein the substrate is composed of a polycarbonate sheet having a thickness above 10 mils and having a surface smoothness in the range of from 0 to 150 Ra; and wherein the multilayer film affixed thereto comprises a thermoplastic adhesiveless film layer, an embossed film layer, and a core film layer interposed between the thermoplastic adhesiveless film layer and the embossed film layer.

25. The article of claim 1, wherein the substrate is composed of a polycarbonate sheet having a thickness of 10 mils or less and having a surface smoothness in the range of from 0 to 150 Ra; and wherein the multilayer film affixed thereto comprises a thermoplastic adhesiveless film layer, an embossed film layer, and a core film layer interposed between the thermoplastic adhesiveless film layer and the embossed film layer.

* * * * *

UNITED STATES PATENT AND TRADEMARK OFFICE
CERTIFICATE OF CORRECTION

PATENT NO. : 5,100,709
DATED : March 31, 1992
INVENTOR(S) : Barger et al.

It is certified that error appears in the above-identified patent and that said Letters Patent is hereby corrected as shown below:

```
column 4, line 38:   delete "microinches" and
                     insert --(micro) inches--.
```

Signed and Sealed this

Eighteenth Day of July, 2000

Attest:

Q. TODD DICKINSON

*Attesting Officer*          *Director of Patents and Trademarks*